(12) United States Patent
Kitou et al.

(10) Patent No.: US 11,485,067 B2
(45) Date of Patent: Nov. 1, 2022

(54) RESIN COMPOSITION FOR MODELING MATERIAL, RESIN COMPOSITION FOR SUPPORTING MATERIAL, PHOTOFABRICATION PRODUCT, AND PROCESS FOR PRODUCING PHOTOFABRICATION PRODUCT

(71) Applicants: MAXELL, LTD., Kyoto (JP); MIMAKI ENGINEERING CO., LTD., Tomi (JP)

(72) Inventors: Katsuyuki Kitou, Osaka (JP); Taeko Izumo, Osaka (JP)

(73) Assignees: MAXELL, LTD., Kyoto (JP); MIMAKI ENGINEERING CO., LTD., Nagano (JP)

( * ) Notice: Subject to any disclaimer, the term of this patent is extended or adjusted under 35 U.S.C. 154(b) by 863 days.

(21) Appl. No.: 15/748,082

(22) PCT Filed: Jul. 27, 2016

(86) PCT No.: PCT/JP2016/072038
§ 371 (c)(1),
(2) Date: Jan. 26, 2018

(87) PCT Pub. No.: WO2017/018453
PCT Pub. Date: Feb. 2, 2017

(65) Prior Publication Data
US 2019/0009453 A1   Jan. 10, 2019

(30) Foreign Application Priority Data
Jul. 29, 2015 (JP) .............................. JP2015-149753

(51) Int. Cl.
| | |
|---|---|
| *B29C 64/112* | (2017.01) |
| *B33Y 70/00* | (2020.01) |
| *C08F 290/06* | (2006.01) |
| *B29C 67/00* | (2017.01) |
| *C08L 33/24* | (2006.01) |
| *B29C 64/264* | (2017.01) |
| *B29C 64/245* | (2017.01) |
| *B29C 64/268* | (2017.01) |
| *C08L 33/08* | (2006.01) |
| *C08L 33/10* | (2006.01) |
| *C08L 71/02* | (2006.01) |
| *C08L 75/06* | (2006.01) |
| *B33Y 10/00* | (2015.01) |
| *B33Y 80/00* | (2015.01) |

(52) U.S. Cl.
CPC .......... *B29C 64/112* (2017.08); *B29C 64/245* (2017.08); *B29C 64/264* (2017.08); *B29C 64/268* (2017.08); *B29C 67/00* (2013.01); *B33Y 70/00* (2014.12); *C08F 290/06* (2013.01); *C08L 33/08* (2013.01); *C08L 33/10* (2013.01); *C08L 33/24* (2013.01); *C08L 71/02* (2013.01); *C08L 75/06* (2013.01); *B33Y 10/00* (2014.12); *B33Y 80/00* (2014.12); *C08L 2205/03* (2013.01)

(58) Field of Classification Search
CPC ...................................................... C08L 33/08
See application file for complete search history.

(56) References Cited

U.S. PATENT DOCUMENTS

| | | | |
|---|---|---|---|
| 8,541,072 B2 * | 9/2013 | Foley | ......................... C08F 2/48 428/32.51 |
| 2004/0175451 A1 | 9/2004 | Maekawa et al. | |
| 2008/0105818 A1 | 5/2008 | Cohen | |
| 2013/0127963 A1 * | 5/2013 | Pratt | .................... C09D 11/101 347/102 |
| 2013/0234370 A1 | 9/2013 | Suzuki et al. | |
| 2014/0248473 A1 | 9/2014 | Makuta | |
| 2016/0115297 A1 | 4/2016 | Norikane et al. | |
| 2017/0252971 A1 | 9/2017 | Umebayashi | |
| 2017/0283631 A1 | 10/2017 | Paul et al. | |
| 2018/0079923 A1 | 3/2018 | Umebayashi | |
| 2018/0291219 A1 | 10/2018 | Kiyosada | |
| 2019/0358892 A1 | 11/2019 | Kito et al. | |
| 2019/0359841 A1 | 11/2019 | Kito et al. | |
| 2020/0407581 A1 | 12/2020 | Kito et al. | |

FOREIGN PATENT DOCUMENTS

| | | |
|---|---|---|
| CN | 1526542 A | 9/2004 |
| CN | 103189187 A | 7/2013 |
| EP | 2 088 176 A1 | 8/2009 |

(Continued)

OTHER PUBLICATIONS

Translation of JP 2004002616A (Year: 2020).*
Communication Pursuant to Article 94(3) EPC issued in corresponding European Patent Application No. 16846563.1, dated Jan. 13, 2020.

(Continued)

*Primary Examiner* — Michael F Pepitone
(74) *Attorney, Agent, or Firm* — McDermott Will & Emery LLP (57) ABSTRACT

A resin composition for a modeling material for use in shaping a modeling material (4) by an ink-jet photofabrication method, the resin composition comprising, based on 100 parts by weight of the whole resin composition, 19 to 49 parts by weight of a water-insoluble monofunctional ethylenically unsaturated monomer (A), 15 to 50 parts by weight of a di- or more-functional polyfunctional ethylenically unsaturated monomer (B), 10 to 45 parts by weight of an oligomer (C), and a photopolymerization initiator (D). By this resin composition for a modeling material, a photofabrication product having good dimensional accuracy can be obtained.

14 Claims, 1 Drawing Sheet

(56) References Cited

FOREIGN PATENT DOCUMENTS

| EP | 2 532 719 A2 | 12/2012 |
|---|---|---|
| EP | 2 636 511 A1 | 9/2013 |
| EP | 3 305 508 A1 | 4/2018 |
| JP | H06-220148 A | 8/1994 |
| JP | 2004-002616 A | 1/2004 |
| JP | 2004-255839 A | 9/2004 |
| JP | 2004-291625 A | 10/2004 |
| JP | 2005-243219 A | 9/2005 |
| JP | 2007-161740 A | 6/2007 |
| JP | 2009-196274 A | 9/2009 |
| JP | 2010-155889 A | 7/2010 |
| JP | 2010-155926 A | 7/2010 |
| JP | 2011-173981 A | 9/2011 |
| JP | 2012-111226 A | 6/2012 |
| JP | 2013-076005 A | 4/2013 |
| JP | 2015-010168 A | 1/2015 |
| JP | 2015-038166 A | 2/2015 |
| JP | 2015-078255 A | 4/2015 |
| JP | 2015-123684 A | 7/2015 |
| JP | 2016-117273 A | 6/2016 |
| JP | 2016-117902 A | 6/2016 |
| WO | 03/029365 A1 | 4/2003 |
| WO | 2015/056614 A1 | 4/2015 |
| WO | 2016/121587 A1 | 8/2016 |
| WO | 2017/018453 A1 | 2/2017 |

OTHER PUBLICATIONS

Japanese Notice of Reasons for Refusal issued in corresponding Japanese Patent Application No. 2015-149753, dated Oct. 15, 2019, with English translation.
Extended European Search Report issued in corresponding European Patent Application No. 16846564.9-1107, dated Apr. 18, 2019.
Chinese Office Action issued in corresponding Chinese Patent Application No. 201680053265.5, dated May 15, 2019, with English Translation.
Extended Search Report issued in corresponding European Patent Application No. 16846563.1-1102, dated May 14, 2019.
Chinese Office Action issued in corresponding Chinese Patent Application No. 201680053320.0, dated May 8, 2019, with English Translation.
Search Report issued in corresponding International Patent Application No. PCT/JP2016/077255, dated Nov. 1, 2016.
English translation of International Preliminary Report on Patentability received in corresponding International Patent Application No. PCT/JP2016/077255, which dated Mar. 20, 2018.
English translation of International Preliminary Report on Patentability issued in corresponding International Patent Application No. PCT/JP2016/077256, dated Mar. 20, 2018.
Extended European Search Report issued a corresponding European Patent Application No. 16830558.9-1107, dated Jun. 14, 2019.
International Preliminary Report on Patentability issued in corresponding International Patent Application No. PCT/JP2016/072038, dated Jan. 30, 2018.
Extended European Search Report issued in corresponding European Patent Application No. 20161752.9-1107, dated Jun. 29, 2020.
Chinese Office Action issued in corresponding Chinese Patent Application No. 201680044098.8, dated Jun. 1, 2020, with English translation.
Chinese Office Action issued in corresponding Chinese Patent Application No. 201680053320.0, dated Aug. 31, 2020, with English Translation.
Chinese Office Action issued in corresponding Chinese Patent Application No. 201680053265.5, dated Aug. 31, 2020, with English Translation.
U.S. PTO Restriction Requirement issued in related U.S. Appl. No. 15/759,807, dated Jun. 11, 2020.
Search Report issued in corresponding International Patent Application No. PCT/JP2016/072038, dated Oct. 4, 2016.
Partial Supplemental European Search Report issued in corresponding European Patent Application No. 16830558.9, dated Feb. 18, 2019.
Chinese Office Action issued in corresponding Chinese Patent Application No. 201680044098.8, dated Aug. 26, 2020, with English translation.
Chinese Decision of Rejection issued in corresponding Chinese Patent Application No. 201680044098.8, dated Mar. 1, 2021, with English translation.
U.S. PTO Non-Final Office issued in related U.S. Appl. No. 15/759,807, dated Jan. 29, 2021.
U.S. PTO Final Office issued in related U.S. Appl. No. 15/759,796, dated Dec. 23, 2020.

* cited by examiner

RESIN COMPOSITION FOR MODELING MATERIAL, RESIN COMPOSITION FOR SUPPORTING MATERIAL, PHOTOFABRICATION PRODUCT, AND PROCESS FOR PRODUCING PHOTOFABRICATION PRODUCT

CROSS REFERENCE

This application is the U.S. National Phase under 35 U.S.C. § 371 of International Application No. PCT/JP2016/072038, filed on Jul. 27, 2016, which claims the benefit of Japanese Application No. 2015-149753, filed on Jul. 29, 2015, the entire contents of each are hereby incorporated by reference.

TECHNICAL FIELD

The present invention relates to a resin composition for a modeling material and a resin composition for a supporting material which are used in an ink-jet photofabrication method, a photofabrication product which is shaped using these resin compositions, and a process for producing the photofabrication product.

BACKGROUND ART

Conventionally, there has been widely known a photofabrication method using a photocurable resin composition which is cured by irradiating ultraviolet rays or the like, as a method for making a three-dimensional shaped article. Specifically, in such a shaping method, a cured layer having a predetermined shape is formed by irradiating the photocurable resin composition with ultraviolet rays or the like. Thereafter, by further supplying and curing a photocurable resin composition on the cured layer, a new cured layer is formed. By repeating the above step, a three-dimensional shaped article is prepared.

Of the shaping method, in recent years, a photofabrication method by an ink-jet system of forming a cured layer having a predetermined shape by discharging a photocurable resin composition from a nozzle, and immediately after the discharge, irradiating ultraviolet rays or the like to cure the composition (hereinafter, referred to as ink-jet photofabrication method) has been reported (JP-A-2004-255839, JP-A-2010-155889, JP-A-2010-155926, and JP-A-2012-111226). The ink-jet photofabrication method does not need installation of a large-scale resin liquid tank for storing the photocurable resin composition, and a dark room. For that reason, a fabrication apparatus can be miniaturized as compared with the conventional method. The ink-jet photofabrication method is paid attention as a shaping method which is realized by a 3D printer capable of freely making a three-dimensional shaped article, based on CAD (Computer Aided Design) data.

In the ink-jet photofabrication method, when a photofabrication product having a complex shape such as a hollow shape is shaped, in order to support a modeling material, the modeling material and a supporting material are formed as a combination (JP-A-2004-255839, JP-A-2010-155889, and JP-A-2012-111226). The supporting material is made by irradiating a photocurable resin composition with ultraviolet rays or the like to cure the resin composition, as in the modeling material. After the modeling material is made, the supporting material is physically peeled, or dissolved in an organic solvent or water, and thereby, the supporting material can be removed.

Furthermore, with regard to the ink-jet photofabrication method, JP-A-2012-111226 discloses a resin composition for a modeling material having very small swelling deformation due to water or moisture absorption on photocuring and after curing, a resin composition for a supporting material, a cured product after curing of which is excellent in solubility in water, and is easily removed, and a photofabrication product which is shaped using these resin compositions.

SUMMARY OF THE INVENTION

Problems to be Solved by the Invention

However, a photofabrication product which is shaped using the conventional resin composition for a modeling material and resin composition for a supporting material has a problem that the dimensional accuracy deteriorates. As the cause of that, for example, insufficient curing or increase in cure shrinkage of the modeling material which is obtained by photocuring the resin composition for a modeling material is conceivable. Additionally, effusion of non-polymerizable ingredients of the resin composition for a supporting material, or deficient self-standing property of a supporting material which is obtained by photocuring the resin composition for a supporting material is conceivable.

The present invention was made in view of the above present situation, and an object thereof is to provide a resin composition for a modeling material and a resin composition for a supporting material for obtaining a photofabrication product having good dimensional accuracy, a photofabrication product which is shaped using these resin compositions, and a process for producing the photofabrication product.

Solutions to the Problems

The present inventors variously studied the problems, and found out that by setting the content of a water-insoluble monofunctional ethylenically unsaturated monomer in a resin composition for a modeling material to fall within a predetermined range, curability of a modeling material which is obtained by photocuring the resin composition for a modeling material becomes good, and cure shrinkage is suppressed. The present inventors found out that by decreasing the content of non-polymerizable ingredients in the resin composition for a supporting material, effusion of non-polymerized ingredients during shaping can be suppressed, and at the same time, by increasing the content of a water-soluble monofunctional ethylenically unsaturated monomer, a supporting material excellent in self-standing property is obtained. The present inventors found out that by solving the problems by either of the resin composition for a modeling material and the resin composition for a supporting material, a photofabrication product having good dimensional accuracy is obtained.

The present invention was made based on the above-mentioned findings, and a subject matter thereof is as follows:

[1] A resin composition for a modeling material for use in shaping a modeling material by an ink-jet photofabrication method, the resin composition comprising, based on 100 parts by weight of the whole resin composition, 19 to 49 parts by weight of a water-insoluble monofunctional ethylenically unsaturated monomer (A), 15 to 50 parts by weight of a di- or more-functional polyfunctional ethylenically unsaturated monomer (B), 10 to 45 parts by weight of an oligomer (C), and a photopolymerization initiator (D).

[2] The resin composition for a modeling material according to [1], wherein the content of the (A) ingredient is 25 to 47 parts by weight, based on 100 parts by weight of the whole resin composition.

[3] The resin composition for a modeling material according to [1] or [2], wherein the content of the (B) ingredient is 20 to 45 parts by weight, based on 100 parts by weight of the whole resin composition.

[4] The resin composition for a modeling material according to any one of [1] to [3], wherein the (C) ingredient is one or more selected from a urethane (meth)acrylate oligomer, an epoxy (meth)acrylate oligomer, and a polyester (meth)acrylate oligomer.

[5] The resin composition for a modeling material according to any one of [1] to [4], wherein the content of the (C) ingredient is 15 to 30 parts by weight, based on 100 parts by weight of the whole resin composition.

[6] The resin composition for a modeling material according to any one of [1] to [5], wherein the content of the (D) ingredient is 3 to 15 parts by weight, based on 100 parts by weight of the whole resin composition.

[7] The resin composition for a modeling material according to any one of [1] to [6], wherein the resin composition further comprises a preservation stabilizer (F) at 0.05 to 3.0 parts by weight based on 100 parts by weight of the whole resin composition.

[8] A resin composition for a supporting material for use in shaping a supporting material by an ink-jet photofabrication method, the resin composition comprising, based on 100 parts by weight of the whole resin composition, 20 to 50 parts by weight of a water-soluble monofunctional ethylenically unsaturated monomer (G), 20 to 49 parts by weight of polyalkylene glycol (H) comprising an oxyethylene group and/or an oxypropylene group, 35 parts by weight or less of a water-soluble organic solvent (I), and a photopolymerization initiator (D).

[9] The resin composition for a supporting material according to [8], wherein the content of the (G) ingredient is 25 to 45 parts by weight, based on 100 parts by weight of the whole resin composition.

[10] The resin composition for a supporting material according to [8] or [9], wherein the content of the (H) ingredient is 25 to 45 parts by weight, based on 100 parts by weight of the whole resin composition.

[11] The resin composition for a supporting material according to any one of [8] to [10], wherein the content of the (D) ingredient is 5 to 20 parts by weight, based on 100 parts by weight of the whole resin composition.

[12] The resin composition for a supporting material according to any one of [8] to [11], wherein the content of the (I) ingredient is 5 parts by weight or more, based on 100 parts by weight of the whole resin composition.

[13] The resin composition for a supporting material according to any one of [8] to [12], wherein the resin composition further comprises a preservation stabilizer (F) at 0.05 to 3.0 parts by weight, based on 100 parts by weight of the whole resin composition.

[14] A photofabrication product comprising a modeling material which is obtained by photocuring a resin composition for a modeling material according to any one of [1] to [7], by an ink-jet photofabrication method.

[15] A process for producing a photofabrication product according to [14] by an ink-jet photofabrication method, the process comprising a step (I) of obtaining a modeling material by photocuring a resin composition for a modeling material according to any one of [1] to [7] and, at the same time, obtaining a supporting material by photocuring a resin composition for a supporting material according to any one of [8] to [13]; and a step (II) of removing the supporting material.

[16] The process for producing a photofabrication product according to [15], wherein, in the step (I), the resin composition for a modeling material and the resin composition for a supporting material are photocured using an ultraviolet LED.

Effects of the Invention

According to the present invention, there can be provided a resin composition for a modeling material and a resin composition for a supporting material for obtaining a photofabrication product having good dimensional accuracy, a photofabrication product which is shaped using these resin compositions, and a process for producing the photofabrication product.

EMBODIMENTS OF THE INVENTION

One embodiment of the present invention (hereinafter, also referred to as present embodiment) will be illustrated in detail below. The present invention is not limited to the following contents. In addition, in the following illustration, "(meth)acrylate" is a generic name of acrylate and methacrylate, and means one or both of acrylate and methacrylate. This also applies to "(meth)acryloyl" and "(meth)acryl".

1. Resin Composition for Modeling Material

The resin composition for a modeling material according to the present embodiment contains, based on 100 parts by weight of the whole resin composition, 19 to 49 parts by weight of a water-insoluble monofunctional ethylenically unsaturated monomer (A), 15 to 50 parts by weight of a di- or more-functional polyfunctional ethylenically unsaturated monomer (B), 10 to 45 parts by weight of an oligomer (C), and a photopolymerization initiator (D).

<Water-Insoluble Monofunctional Ethylenically Unsaturated Monomer (A)>

The water-insoluble monofunctional ethylenically unsaturated monomer (A) is an ingredient which polymerizes by photoirradiation to cure the resin composition for a modeling material. The content of the (A) ingredient is 19 to 49 parts by weight, based on 100 parts by weight of the whole resin composition. When the content of the (A) ingredient is less than 19 parts by weight, cure shrinkage of a modeling material which is obtained by photocuring the resin composition for a modeling material becomes large. As a result, the dimensional accuracy of the modeling material deteriorates. On the other hand, when the content of the (A) ingredient is more than 49 parts by weight, insufficient curing is generated in the modeling material. As a result, the dimensional accuracy of the modeling material deteriorates. The content of the (A) ingredient is preferably 25 parts by weight or more, and preferably 47 parts by weight or less.

The (A) ingredient is a water-insoluble polymerizable monomer having one ethylenic double bond in a molecule having property that it is cured by energy rays. Examples of the (A) ingredient include linear or branched alkyl (meth) acrylates with 4 to 30 carbon atoms (e.g. methyl (meth) acrylate, ethyl (meth)acrylate, isobutyl (meth)acrylate, lauryl (meth)acrylate, stearyl (meth)acrylate, isostearyl (meth) acrylate, t-butyl (meth)acrylate etc.), alicycle-containing (meth)acrylates with 6 to 20 carbon atoms (e.g. cyclohexyl (meth)acrylate, 4-t-cyclohexyl (meth)acrylate, isobornyl (meth)acrylate, phenoxyethyl (meth)acrylate, dicyclopentanyl (meth)acrylate etc.), heterocycle-containing (meth)acrylates with 5 to 20 carbon atoms (e.g. tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane, adamantyl (meth)acrylate etc.), and the like. These may be used alone, or two or more thereof may be used in combination. In addition, when two or more of the (A) ingredient are contained, the above content is a total of the contents of respective (A) ingredients.

Among these, from a viewpoint that curability of the resin composition for a modeling material is improved, one or more selected from isobornyl (meth)acrylate, phenoxyethyl (meth)acrylate, and tetrahydrofurfuryl (meth)acrylate are preferred. Furthermore, from a viewpoint that the dimensional accuracy of the modeling material is improved by the fact that the resin composition for a modeling material has such heat resistance that it can stand a temperature (50 to 90° C.) on photocuring, isobornyl (meth)acrylate is more preferred.

<Bi- or More-Functional Polyfunctional Ethylenically Unsaturated Monomer (B)>

The di- or more-functional polyfunctional ethylenically unsaturated monomer (B) is an ingredient which polymerizes by photoirradiation to cure the resin composition for a modeling material. The content of the (B) ingredient is 15 to 50 parts by weight, based on 100 parts by weight of the whole resin component. When the content of the (B) ingredient is less than 15 parts by weight, insufficient curing is generated in the modeling material. As a result, the dimensional accuracy of the modeling material deteriorates. On the other hand, when the content of the (B) ingredient is more than 50 parts by weight, cure shrinkage of the modeling material becomes large. As a result, the dimensional accuracy of the modeling material deteriorates. The content of the (B) ingredient is preferably 20 parts by weight or more, and preferably 45 parts by weight or less.

The (B) ingredient is a polymerizable monomer having two or more ethylenic double bonds in a molecule having such property that it is cured by energy rays. Examples of the (B) ingredient include linear or branched alkylene glycol di(meth)acrylates or alkylene glycol tri(meth)acrylates with 10 to 25 carbon atoms [e.g. tripropylene glycol di(meth) acrylate, 1,6-hexanediol di(meth)acrylate, neopentyl glycol di(meth)acrylate, 1,9-nonanediol di(meth)acrylate, 3-methyl-1,5-pentanediol di(meth)acrylate, 2-n-butyl-2-ethyl-1,3-propanediol di(meth)acrylate, pentaerythritol tri (meth)acrylate etc.], alicycle-containing di(meth)acrylates with 10 to 30 carbon atoms [e.g. dimethylol tricyclodecane di(meth)acrylate etc.] and the like. These may be used alone, or two or more thereof may be used in combination. In addition, when two or more of the (B) ingredient are contained, the above content is a total of the contents of respective (B) ingredients.

Among these, from a viewpoint that curability of the resin composition for a modeling material is improved, one or more selected from tripropylene glycol di(meth)acrylate, 1,6-hexanediol di(meth)acrylate, and pentaerythritol tri (meth)acrylate are preferred. Furthermore, from a viewpoint that the dimensional accuracy of the modeling material is improved by the fact that the resin composition for a modeling material has such heat resistance that it can endure a temperature (50 to 90° C.) on photocuring, 1,6-hexanediol di(meth)acrylate, or pentaerythritol tri(meth)acrylate is more preferred.

<Oligomer (C)>

The oligomer (C) is an ingredient which polymerizes by photoirradiation to cure the resin composition for a modeling material, and enhances the breaking strength of a modeling material which is obtained by the curing. The content of the (C) ingredient is 10 to 45 parts by weight, based on 100 parts by weight of the whole resin composition. When the content of the (C) ingredient is less than 10 parts by weight, cure shrinkage of the modeling material becomes slightly large. As a result, there is a possibility that the dimensional accuracy of the modeling material deteriorates. Additionally, the breaking strength of the modeling material is inferior. On the other hand, when the content of the (C) ingredient is more than 45 parts by weight, the viscosity of the resin composition for a modeling material becomes high. For that reason, there is a possibility that when the resin composition for a modeling material is discharged from an ink-jet head, jetting property deteriorates to cause flight deflection. As a result, there is a possibility that the dimensional accuracy of the modeling material deteriorates. The content of the (C) ingredient is preferably 15 parts by weight or more, and preferably 30 parts by weight or less.

Examples of the (C) ingredient include a urethane (meth) acrylate oligomer, an epoxy (meth)acrylate oligomer, a polyester (meth)acrylate oligomer, a polyether (meth)acrylate oligomer, and the like. These may be used alone, or two or more thereof may be used in combination. Among these, from a viewpoint that curability of the resin composition for a modeling material is improved, one or more selected from a urethane (meth)acrylate oligomer, an epoxy (meth)acrylate oligomer, and a polyester (meth)acrylate oligomer are preferred. Furthermore, from a viewpoint that the dimensional accuracy of the modeling material is improved by the fact that the resin composition for a modeling material has such heat resistance that it can endure a temperature (50 to 90° C.) on photocuring, a urethane (meth)acrylate oligomer is more preferred.

Additionally, among a urethane (meth)acrylate oligomer, an epoxy (meth)acrylate oligomer, a polyester (meth)acrylate oligomer, and a polyether (meth)acrylate oligomer, a di- or more-functional polyfunctional oligomer is preferred, and a difunctional oligomer is more preferred.

In addition, when two or more of the (C) ingredient are contained, the above content is a total of the contents of respective (C) ingredients.

Herein, in the present description, the "oligomer" has a weight average molecular weight of 800 to 10,000. A weight average molecular weight means a weight average molecular weight in terms of polystyrene, which is measured by GPC (Gel Permeation Chromatography).

<Photopolymerization Initiator (D)>

The photopolymerization initiator (D) is not particularly limited as long as it is a compound which promotes a radical reaction when irradiated with light having a wavelength in a region of ultraviolet rays, near ultraviolet rays or visible light. Examples of the (D) ingredient include benzoin compounds with 14 to 18 carbon atoms [e.g. benzoin, benzoin methyl ether, benzoin ethyl ether, benzoin propyl ether, benzoin isobutyl ether etc.], acetophenone compounds with 8 to 18 carbon atoms [e.g. acetophenone, 2,2-diethoxy-2-phenylacetophenone, 2,2-diethoxy-2-phenylacetophenone, 1,1-dichloroacetophenone, 2-hydroxy-2-methyl-phenylpropane-1-one, diethoxyacetophenone, 1-hydroxycyclohexyl phenyl ketone, 2-methyl-1-[4-(methylthio)phenyl]-2-morpholinopropane-1-one etc.], anthraquinone compounds with 14 to 19 carbon atoms [e.g. 2-ethylanthraquinone, 2-t-butylanthraquinone, 2-chloroanthraquinone, 2-amylanthraquinone etc.], thioxanthone compounds with 13 to 17 carbon atoms [e.g. 2,4-diethylthioxanthone, 2-isopropylthioxanthone, 2-chlorothioxanthone etc.], ketal compounds with 16 to 17 carbon atoms [e.g. acetophenone dimethyl ketal, benzyl dimethyl ketal etc.], benzophenone compounds with 13 to 21 carbon atoms [e.g. benzophenone, 4-benzoyl-4'-methyldiphenyl sulfide, 4,4'-bismethylaminobenzophenone etc.], acylphosphine oxide compounds with 22 to 28 carbon atoms [e.g. 2,4,6-trimethylbenzoyl-diphenyl-phosphine oxide, bis-(2,6-dimethoxybenzoyl)-2,4,4-trimethylpentylphosphine oxide, bis(2,4,6-trimethylbenzoyl)-phenylphosphine oxide], a mixture of these compounds, and the like. These may be used alone, or two or more thereof may be used in combination. Among these, from a viewpoint of light resistance that a modeling material which is obtained by photocuring the resin composition for a modeling material hardly turns yellow, 2,4,6-trimethylbenzoyl-diphenyl-phosphine oxide is preferred. Additionally, examples of an available acylphosphine oxide compound include DAROCURE TPO manufactured by BASF SE, and the like.

The content of the (D) ingredient is preferably 3 to 15 parts by weight, based on 100 parts by weight of the whole resin composition. When the content of the (D) ingredient falls within the above-mentioned range, curability of the resin composition for a modeling material becomes good, and the dimensional accuracy of a modeling material is improved. The content of the (D) ingredient is more preferably 5 parts by weight or more, and more preferably 13 parts by weight or less. In addition, when two or more of the (D) ingredient are contained, the above content is a total of the contents of respective (D) ingredients.

<Surface Adjusting Agent (E)>

In order to adjust the surface tension of the resin composition in an appropriate range, the surface adjusting agent (E) may be contained. By adjusting the surface tension of the resin composition in an appropriate range, the resin composition for a modeling material and the resin composition for a supporting material can be suppressed from being mixed at an interface. As a result, these resin compositions can be used to obtain a photofabrication product having good dimensional accuracy. In order to obtain this effect, the content of the (E) ingredient is preferably 0.005 to 3.0 parts by weight, based on 100 parts by weight of the whole resin composition.

Examples of the (E) ingredient include a silicone-based compound and the like. Examples of the silicone-based compound include a silicone-based compound having a polydimethylsiloxane structure and the like. Specifically, examples thereof include polyether-modified polydimethylsiloxane, polyester-modified polydimethylsiloxane, polyaralkyl-modified polydimethylsiloxane, and the like. As these, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, and BYK-UV3570 (all of the above are manufactured by BYK Chemie), TEGO-Rad2100, TEGO-Rad2200N, TEGO-Rad2250, TEGO-Rad2300, TEGO-Rad2500, TEGO-Rad2600, and TEGO-Rad2700 (all of the above are manufactured by Degussa AG), Granol 100, Granol 115, Granol 400, Granol 410, Granol 435, Granol 440, Granol 450, B-1484, Polyflow-ATF-2, KL-600, UCR-L72, and UCR-L93 (manufactured by KYOEISHA CHEMICAL Co., LTD.) and the like, as expressed by a trade name, may be used. These may be used alone, or two or more thereof may be used in combination. In addition, when two or more of the (E) ingredient are contained, the above content is a total of the contents of respective (E) ingredients.

<Preservation Stabilizer (F)>

It is preferable that the resin composition for a modeling material according to the present embodiment further contains a preservation stabilizer (F). The preservation stabilizer (F) can enhance preservation stability of the resin composition. Additionally, head clogging which is generated by polymerization of a polymerizable compound with the heat energy can be prevented. In order to obtain these effects, the content of the (F) ingredient is preferably 0.05 to 3.0 parts by weight, based on 100 parts by weight of the whole resin composition.

Examples of the (F) ingredient include a hindered amine-based compound (HALS), a phenol-based antioxidant, a phosphorus-based antioxidant, and the like. Specifically, examples thereof include hydroquinone, methoquinone, benzoquinone, p-methoxyphenol, hydroquinone monomethyl ether, hydroquinone monobutyl ether, TEMPO, 4-hydorxy-TEMPO, TEMPOL, Cupherron AI, IRGASTAB UV-10, IRGASTAB UV-22, FIRSTCURE ST-1 (manufactured by ALBEMARLE company), t-butylcatechol, pyrogallol, and TINUVIN 111 FDL, TINUVIN 144, TINUVIN 292, TINUVIN XP40, TINUVIN XP60, and TINUVIN 400 manufactured by BASF SE, and the like. These may be used alone, or two or more thereof may be used in combination. In addition, when two or more of the (F) ingredient are contained, the above content is a total of the contents of respective (F) ingredients.

<Water-Soluble Monofunctional Ethylenically Unsaturated Monomer (G)>

It is preferable that the resin composition for a modeling material according to the present embodiment does not contain the water-soluble monofunctional ethylenically unsaturated monomer (G). When the resin composition for a modeling material includes the (G) ingredient, swelling deformation of the modeling material is caused due to water or moisture adsorption on photocuring and after curing, in some cases. As a result, there is a possibility that the dimensional accuracy of the modeling material deteriorates. Details of the (G) ingredient will be described later.

The resin composition for a modeling material can contain other additive agents as necessary, in such a range that the effect of the present invention is not impaired. Examples of other additive agents include an antioxidant, a coloring agent, an ultraviolet absorbing agent, a light stabilizer, a polymerization inhibitor, a chain transfer agent, a filler, and the like.

The resin composition for a modeling material according to the present embodiment is not particularly limited, but can be produced, for example, by uniformly mixing the (A) to (D) ingredients, and optionally (E) to (G) ingredients, and other additive agents using a mixing and stirring device or the like.

It is preferable that the thus produced resin composition for a modeling material according to the present embodiment has the viscosity at 25° C. of 70 mPa·s or less, from a viewpoint that dischargeability from an ink-jet head is made to be good. In addition, measurement of the viscosity of the resin composition for a modeling material is performed using a R100-type viscometer in accordance with JIS Z 8803.

2. Resin Composition for Supporting Material

The resin composition for a supporting material according to the present embodiment includes, based on 100 parts by weight of the whole resin composition, 20 to 50 parts by weight of a water-soluble monofunctional ethylenically unsaturated monomer (G), 20 to 49 parts by weight of polyalkylene glycol (H) containing an oxyethylene group and/or an oxypropylene group, 35 parts by weight or less of a water-soluble organic solvent (I), and a photopolymerization initiator (D).

<Water-Soluble Monofunctional Ethylenically Unsaturated Monomer (G)>

The water-soluble monofunctional ethylenically unsaturated monomer (G) is an ingredient which polymerizes by photoirradiation to cure the resin composition for a supporting material. The monomer (G) is also an ingredient which rapidly dissolves a supporting material which is obtained by photocuring the resin composition for a supporting material, in water. The content of the (G) ingredient is 20 to 50 parts by weight, based on 100 parts by weight of the whole resin composition. When the content of the (G) ingredient is less than 20 parts by weight, self-standing property in the supporting material is not sufficient. For that reason, when the supporting material is disposed on a lower layer of a modeling material, it cannot sufficiently support the modeling material. As a result, the dimensional accuracy of the modeling material deteriorates. On the other hand, when the content of the (G) ingredient is more than 50 parts by weight, the supporting material is inferior in solubility in water. When the time for immersion in water until the supporting material is completely removed becomes longer, the modeling material is slightly swollen. As a result, in a microstructural part of the modeling material, the dimensional accuracy deteriorates in some cases. The content of the (G) ingredient is preferably 25 parts by weight or more, and preferably 45 parts by weight or less.

The (G) ingredient is a water-soluble polymerizable monomer having one ethylenic double bond in a molecule having such property that it is cured with energy rays. Examples of the (G) ingredient include hydroxy group-containing (meth)acrylates with 5 to 15 carbon atoms [e.g. hydroxyethyl (meth)acrylate, hydroxypropyl (meth)acrylate, 4-hydroxybutyl (meth)acrylate etc.], hydroxy group-containing (meth)acrylates with Mn of 200 to 1,000 [polyethylene glycol mono(meth)acrylate, monoalkoxy (1 to 4 carbon atoms) polyethylene glycol mono(meth)acrylate, polypropylene glycol mono(meth)acrylate, monoalkoxy (1 to 4 carbon atoms) polypropylene glycol mono(meth)acrylate, mono(meth)acrylate of PEG-PPG block polymer etc.], (meth)acrylamide derivatives with 3 to 15 carbon atoms [(meth)acrylamide, N-methyl(meth)acrylamide, N-ethyl (meth)acrylamide, N-propyl(meth)acrylamide, N-butyl (meth)acrylamide, N,N'-dimethyl(meth)acrylamide, N,N'-diethyl(meth)acrylamide, N-hydroxyethyl(meth) acrylamide, N-hydroxypropyl(meth)acrylamide, N-hydroxybutyl(meth)acrylamide etc.], (meth)acryloylmorpholine, and the like. These may be used alone, or two or more thereof may be used in combination. In addition, when two or more of the (G) ingredient are contained, the above content is a total of the contents of respective (G) ingredients.

Among these, from a viewpoint that curability of the resin composition for a supporting material is improved, N,N'-dimethyl(meth)acrylamide, N-hydroxyethyl(meth)acrylamide, (meth)acryloylmorpholine, and the like are preferred. Furthermore, from a viewpoint of skin low irritation to a human body, N-hydroxyethyl(meth)acrylamide, and (meth)acryloylmorpholine are more preferred.

<Polyalkylene Glycol Including Oxyethylene Group and/or Oxypropylene Group (H)>

The polyalkylene glycol containing an oxyethylene group and/or an oxypropylene group (H) can enhance solubility of the supporting material in water. The content of the (H) ingredient is 20 to 49 parts by weight, based on 100 parts by weight of the whole resin composition. When the content of the (H) ingredient is less than 20 parts by weight, the supporting material is inferior in solubility in water. When the time for immersion in water until the supporting material is completely removed becomes longer, a modeling material is slightly swollen. As a result, in a microstructural part of the modeling material, the dimensional accuracy deteriorates in some cases. On the other hand, when the content of the (H) ingredient is more than 49 parts by weight, effusion of the (H) ingredient is generated upon photocuring of the resin composition for a supporting material, in some cases. When effusion of the (H) ingredient is generated, adherence between the supporting material and the modeling material at an interface deteriorates. As a result, the modeling material becomes easy to be peeled from the supporting material on cure shrinkage, and the dimensional accuracy deteriorates in some cases. Additionally, when the content of the (H) ingredient is more than 49 parts by weight, the viscosity of the resin composition for a supporting material becomes high. For that reason, there is a possibility that when the resin composition for a supporting material is discharged from an ink-jet head, jetting property deteriorates to cause flight deflection. As a result, the dimensional accuracy of the supporting material deteriorates. Accordingly, the dimensional accuracy of the modeling material which was molded on an upper layer of the supporting material also deteriorates. The content of the (H) ingredient is preferably 25 parts by weight or more, and preferably 45 parts by weight or less.

The (H) ingredient is such that at least ethylene oxide and/or propylene oxide is (are) added to an active hydrogen compound. Examples of the (H) ingredient include polyethylene glycol, polypropylene glycol, and the like. These may be used alone, or two or more thereof may be used in combination. Examples of the active hydrogen compound include a monohydric to tetrahydric alcohol, an amine compound, and the like. Among these, a dihydric alcohol or water is preferred. In addition, when two or more of the (H) ingredient are contained, the above content is a total of the contents of respective (H) ingredients.

A number average molecular weight Mn of the (H) ingredient is preferably 100 to 5,000. When Mn of the (H) ingredient falls within the above-mentioned range, the (H) ingredient is compatible with the (G) ingredient before photocuring and is not compatible with the (G) ingredient after photocuring. As a result, self-standing property of the supporting material can be enhanced, and solubility of the supporting material in water can be enhanced. Mn of the (H) ingredient is more preferably 200 to 3,000, and further preferably 400 to 2,000.

<Water-Soluble Organic Solvent (I)>

The water-soluble organic solvent (I) is an ingredient which improves solubility of the supporting material in water. The water-soluble organic solvent (I) is also an ingredient which adjusts the resin composition for a supporting material at a low viscosity. The content of the (I) ingredient is 35 parts by weight or less, based on 100 parts by weight of the whole resin composition. When the content of the (I) ingredient is more than 35 parts by weight, effusion of the (I) ingredient is generated, upon photocuring of the resin composition for a supporting material. For that reason, the dimensional accuracy of a modeling material which was formed on an upper layer of the supporting material deteriorates. From a viewpoint that solubility of the supporting material in water is improved, and the resin composition for a supporting material is adjusted at a low viscosity, the content of the (I) ingredient is preferably 5 parts by weight or more, and more preferably 10 parts by weight or more. Additionally, the content of (I) ingredient is preferably 30 parts by weight or less.

Examples of the (I) ingredient include ethylene glycol monoacetate, propylene glycol monoacetate, diethylene glycol monoacetate, dipropylene glycol monoacetate, triethylene glycol monoacetate, tripropylene glycol monoacetate, tetraethylene glycol monoacetate, tetrapropylene glycol monoacetate, ethylene glycol monomethyl ether, propylene glycol monomethyl ether, diethylene glycol monomethyl ether, dipropylene glycol monomethyl ether, triethylene glycol monomethyl ether, tripropylene glycol monomethyl ether, tetraethylene glycol monomethyl ether, tetrapropylene glycol monomethyl ether, ethylene glycol monoethyl ether, propylene glycol monoethyl ether, diethylene glycol monoethyl ether, dipropylene glycol monoethyl ether, triethylene glycol monoethyl ether, tripropylene glycol monoethyl ether, tetraethylene glycol monoethyl ether, tetrapropylene glycol monoethyl ether, ethylene glycol monopropyl ether, propylene glycol monopropyl ether, diethylene glycol monopropyl ether, dipropylene glycol monopropyl ether, triethylene glycol monopropyl ether, tripropylene glycol monopropyl ether, tetraethylene glycol monopropyl ether, tetrapropylene glycol monopropyl ether, ethylene glycol monobutyl ether, propylene glycol monobutyl ether, diethylene glycol monobutyl ether, dipropylene glycol monobutyl ether, triethylene glycol monobutyl ether, tripropylene glycol monobutyl ether, tetraethylene glycol monobutyl ether, tetrapropylene glycol monobutyl ether, ethylene glycol diacetate, propylene glycol diacetate, diethylene glycol diacetate, dipropylene glycol diacetate, triethylene glycol diacetate, tripropylene glycol diacetate, tetraethylene glycol diacetate, tetrapropylene glycol diacetate, ethylene glycol dimethyl ether, propylene glycol dimethyl ether, diethylene glycol dimethyl ether, dipropylene glycol dimethyl ether, triethylene glycol dimethyl ether, tripropylene glycol dimethyl ether, tetraethylene glycol dimethyl ether, tetrapropylene glycol dimethyl ether, ethylene glycol diethyl ether, propylene glycol diethyl ether, diethylene glycol diethyl ether, dipropylene glycol diethyl ether, triethylene glycol diethyl ether, tripropylene glycol diethyl ether, tetraethylene glycol diethyl ether, tetrapropylene glycol diethyl ether, ethylene glycol dipropyl ether, propylene glycol dipropyl ether, diethylene glycol dipropyl ether, dipropylene glycol dipropyl ether, triethylene glycol dipropyl ether, tripropylene glycol dipropyl ether, tetraethylene glycol dipropyl ether, tetrapropylene glycol dipropyl ether, ethylene glycol dibutyl ether, propylene glycol dibutyl ether, diethylene glycol dibutyl ether, dipropylene glycol dibutyl ether, triethylene glycol dibutyl ether, tripropylene glycol dibutyl ether, tetraethylene glycol dibutyl ether, tetrapropylene glycol dibutyl ether, ethylene glycol monomethyl ether acetate, propylene glycol monomethyl ether acetate, diethylene glycol monomethyl ether acetate, dipropylene glycol monomethyl ether acetate, triethylene glycol monomethyl ether acetate, tripropylene glycol monomethyl ether acetate, tetraethylene glycol monomethyl ether acetate, tetrapropylene glycol monomethyl ether acetate, ethylene glycol monoethyl ether acetate, propylene glycol monoethyl ether acetate, diethylene glycol monoethyl ether acetate, dipropylene glycol monoethyl ether acetate, triethylene glycol monoethyl ether acetate, tripropylene glycol monoethyl ether acetate, tetraethylene glycol monoethyl ether acetate, tetrapropylene glycol monoethyl ether acetate, ethylene glycol monopropyl ether acetate, propylene glycol monopropyl ether acetate, diethylene glycol monopropyl ether acetate, dipropylene glycol monopropyl ether acetate, triethylene glycol monopropyl ether acetate, tripropylene glycol monopropyl ether acetate, tetraethylene glycol monopropyl ether acetate, tetrapropylene glycol monopropyl ether acetate, ethylene glycol monobutyl ether acetate, propylene glycol monobutyl ether acetate, diethylene glycol monobutyl ether acetate, dipropylene glycol monobutyl ether acetate, triethylene glycol monobutyl ether acetate, tripropylene glycol monobutyl ether acetate, tetraethylene glycol monobutyl ether acetate, tetrapropylene glycol monobutyl ether acetate, and the like. These may be used alone, or two or more thereof may be used in combination. Among these, from a viewpoint that solubility of the supporting material in water is improved, and the resin composition for a supporting material is adjusted at a low viscosity, triethylene glycol monomethyl ether or dipropylene glycol monomethyl ether acetate is more preferred. In addition, when two or more of the (I) ingredient are contained, the above content is a total of the contents of respective (I) ingredients.

<Photopolymerization Initiator (D)>

As the photopolymerization initiator (D), the same ingredients as those for the resin composition for a modeling material according to the present embodiment can be used. The content of the (D) ingredient is preferably 5 to 20 parts by weight, based on 100 parts by weight of the whole resin composition. When the content of the (D) ingredient falls within the above-mentioned range, self-standing property of the resin composition for a supporting material becomes good. For that reason, the dimensional accuracy of a modeling material which is molded on an upper layer of the supporting material is improved. The content of the (D) ingredient is more preferably 7 parts by weight or more, and more preferably 18 parts by weight or less. In addition, when two or more of the (D) ingredient are contained, the above content is a total of the contents of respective (D) ingredients.

<Surface Adjusting Agent (E)>

As the surface adjusting agent (E), the same ingredients as those for the resin composition for a modeling material according to the present embodiment can be used at the same contents.

<Preservation Stabilizer (F)>

It is preferable that the resin composition for a supporting material according to the present embodiment further contains a preservation stabilizer (F). As the preservation stabilizer (F), the same ingredients as those for the resin composition for a modeling material according to the present embodiment can be used at the same contents.

The resin composition for a supporting material can contain other additive agents as needed, in such a range that the effect of the present invention is not impaired. Examples of other additive agents include an antioxidant, a coloring agent, an ultraviolet absorbing agent, a light stabilizer, a polymerization inhibitor, a chain transfer agent, a filler, and the like.

A process for producing the resin composition for a supporting material according to the present embodiment is not particularly limited. The resin composition can be produced, for example, by uniformly mixing the (D), and (G) to (I) ingredients, and optionally, the (E) and (F) ingredients, and other additive agents using a mixing and stirring device or the like.

From a viewpoint that dischargeability from an ink-jet head is made to be good, the thus produced resin composition for a supporting material according to the present embodiment has the viscosity at the 25° C. of 70 mPa·s or less. In addition, measurement of the viscosity of the resin composition for a supporting material is performed using a R100-type viscometer in accordance with JIS Z 8803.

3. Photofabrication Product and Process for Production Thereof

The photofabrication product according to the present embodiment is produced through a step (I) of obtaining a modeling material by photocuring the resin composition for a modeling material according to the present embodiment, and at the same time, obtaining a supporting material by photocuring the resin composition for a supporting material according to the present embodiment, by an ink-jet photofabrication method, and a step (II) of removing the supporting material. The step (I) and the step (II) are not particularly limited, but can be performed, for example, by the following method.

<Step (I)>

Figure 1:
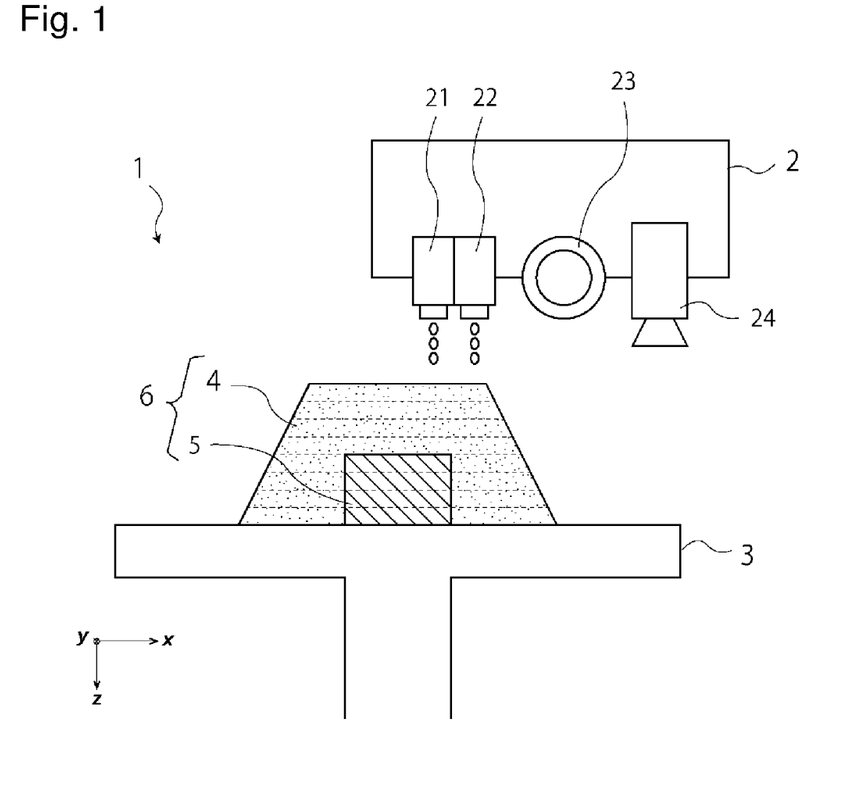
FIG. 1 is a view schematically showing a step (I) in a process for producing a photofabrication product according to the present embodiment.

FIG. 1 is a view schematically showing the step (I) in a process for producing the photofabrication product according to the present embodiment. As shown in FIG. 1, a three-dimensional shaping apparatus 1 contains an ink-jet head module 2 and a shaping table 3. The ink-jet head module 2 has an ink-jet head 21 for a modeling material, which is filled with a resin composition for a modeling material, an ink-jet head 22 for a supporting material, which is filled with a resin composition for a supporting material, a roller 23, and a light source 24.

First, the ink-jet head module 2 is scanned in the X-direction and the Y-direction to the shaping table 3 in FIG. 1, and at the same time, the resin composition for a modeling material is discharged from the ink-jet head 21 for a modeling material, and the resin composition for a supporting material is discharged from the ink-jet head 22 for a supporting material, and thereby, a resin composition layer comprising the resin composition for a modeling material and the resin composition for a supporting material is formed. In order to make an upper surface of the resin composition layer smooth, an extra resin composition for a modeling material and resin composition for a supporting material are removed using the roller 23. By irradiating these resin compositions with light using the light source 24, a cured layer comprising a modeling material 4 and a supporting material 5 is formed on the shaping table 3.

Then, the shaping table 3 is lowered in the Z-direction in FIG. 1, by a thickness of the cured layer. Thereafter, by the same method as that described above, a cured layer comprising a modeling material 4 and a supporting material 5 is further formed on the cured layer. By repeating these steps, a cured product 6 comprising the modeling material 4 and the supporting material 5 is prepared.

Examples of light for curing the resin compositions include far infrared rays, infrared rays, visible rays, near ultraviolet rays, ultraviolet rays, and the like. Among these, from a viewpoint of easiness and efficiency of curing working, near ultraviolet rays or ultraviolet rays are preferred.

Examples of the light source 24 include a mercury lamp, a metal halide lamp, an ultraviolet LED, an ultraviolet laser, and the like. Among these, from a viewpoint of miniaturization of facility and electric power saving, an ultraviolet LED is preferred. In addition, when an ultraviolet LED is used as the light source 24, the integrated light quantity of ultraviolet rays is preferably around 500 mJ/cm$^2$.

<Step (II)>

Figure 2:
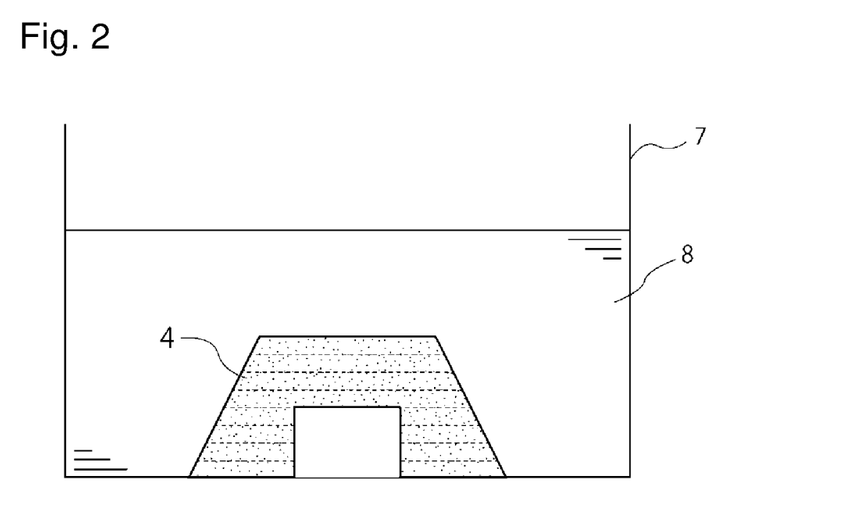
FIG. 2 is a view schematically showing a step (II) in a process for producing a photofabrication product according to the present embodiment.

FIG. 2 is a view schematically showing the step (II) in a process for producing the photofabrication product according to the present embodiment. As shown in FIG. 2, the cured product 6 comprising the modeling material 4 and the supporting material 5, which was prepared in the step (I), is immersed in a solvent 8 contained in a container 7. Thereby, the supporting material 5 can be dissolved in the solvent 8, and removed.

Examples of the solvent 8 which dissolves the supporting material include ion-exchanged water, distilled water, tap water, well water, and the like. Among these, from a viewpoint that an amount of impurities is relatively small, and the solvent is available at the low cost, ion-exchanged water is preferred.

The photofabrication product which was obtained by the foregoing steps contains a modeling material which is obtained by photocuring the resin composition for a modeling material according to the present embodiment. As described above, in the resin composition for a modeling material according to the present embodiment, curability of a modeling material which is obtained by photocuring is good, and cure shrinkage is hardly increased. Accordingly, the modeling material having good dimensional accuracy is obtained. Additionally, in the resin composition for a supporting material according to the present embodiment, on photocuring, effusion of non-polymerized ingredients is hardly generated. Furthermore, a supporting material which is obtained by photocuring the resin composition for a supporting material according to the present embodiment is excellent in self-standing property. For that reason, the modeling material having good dimensional accuracy is formed on an upper layer of the supporting material. From the forgoing, a photofabrication product which was produced using the resin composition for a modeling material according to the present embodiment and the resin composition for a supporting material according to the present embodiment has good dimensional accuracy.

Examples which more specifically disclose the present embodiment will be shown below. In addition, the present invention is not limited to these examples.

EXAMPLES

<Resin Composition for Modeling Material>

(Production of Resin Composition for Modeling Material)

(A) to (G) ingredients were uniformly mixed using a mixing and stirring device at proportioning shown in Table 1 to produce resin compositions for a modeling material of Examples M1 to M17 and Comparative Examples m1 to m6. These resin compositions for a modeling material were used to perform the following evaluation.

In addition, in the Examples, the resin compositions for a modeling material were cured using an ultraviolet LED as an irradiation means, as described later. With regard to the resin composition for a modeling material of Example M16, since the content of the (D) ingredient is less than 3 parts by weight, the resin composition was not sufficiently cured even when an ultraviolet LED was irradiated. Accordingly, with regard to the resin composition for a modeling material of Example M16, evaluations after cure shrinkage were not performed. Furthermore, with regard to the resin composition for a modeling material of Example M17, since the content of the (D) ingredient is more than 15 parts by weight, the (D) ingredient was not sufficiently dissolved, and the undissolved residue was generated. Thereby, even when the resin composition for a modeling material of Example M17 a modeling material of Comparative Example m1, evaluations after cure shrinkage were not performed.

TABLE 1

| Resin composition for modeling material | | | M1 | M2 | M3 | M4 | M5 | M6 | M7 | M8 |
|---|---|---|---|---|---|---|---|---|---|---|
| Proportioning (part by weight) | (A) Water-insoluble monofunctional ethylenically unsaturated monomer | IBOA | 46.6 | 46.6 | 46.6 | — | — | 46.6 | 19.6 | 26.6 |
| | | THFA | — | — | — | 46.6 | — | — | — | — |
| | | PEA | — | — | — | — | 46.6 | — | — | — |
| | (B) Di- or more-functional polyfunctional ethylenically unsaturated monomer | HDDA | 20 | 20 | 20 | 20 | 20 | — | 47 | 20 |
| | | TPGDA | — | — | — | — | — | 20 | — | — |
| | | PE-3A | — | — | — | — | — | — | — | — |
| | (C) Oligomer | CN991 | 25 | — | — | 25 | 25 | 25 | 25 | 45 |
| | | EBECRYL3708 | — | 25 | — | — | — | — | — | — |
| | | CN2203 | — | — | 25 | — | — | — | — | — |
| | (D) Photopolymerization initiator | DAROCURE TPO | 8 | 8 | 8 | 8 | 8 | 8 | 8 | 8 |
| | (E) Surface adjusting agent | TEGO-Rad2100 | 0.1 | 0.1 | 0.1 | 0.1 | 0.1 | 0.1 | 0.1 | 0.1 |
| | (F) Preservation stabilizer | H-TEMPO | 0.3 | 0.3 | 0.3 | 0.3 | 0.3 | 0.3 | 0.3 | 0.3 |
| | (G) Water-soluble ethylenically unsaturated monomer | ACMO | — | — | — | — | — | — | — | — |

| Resin composition for modeling material | | | M9 | M10 | M11 | M12 | M13 | M14 | M15 | M16 |
|---|---|---|---|---|---|---|---|---|---|---|
| Proportioning (part by weight) | (A) Water-insoluble monofunctional ethylenically unsaturated monomer | IBOA | 46.6 | 46.6 | 39.6 | 26.6 | 46.6 | 46.6 | 30.0 | 46.6 |
| | | THFA | — | — | — | 20.0 | — | — | — | — |
| | | PEA | — | — | — | — | — | — | — | — |
| | (B) Di- or more-functional polyfunctional ethylenically unsaturated monomer | HDDA | 20 | 25 | 20 | 20 | 20 | 15 | 20 | 27 |
| | | TPGDA | — | — | — | — | — | — | — | — |
| | | PE-3A | 15 | — | — | — | — | — | — | — |
| | (C) Oligomer | CN991 | 10 | 25 | 25 | 25 | 15 | 30 | 25 | 25 |
| | | EBECRYL3708 | — | — | — | — | — | — | — | — |
| | | CN2203 | — | — | — | — | 10 | — | — | — |
| | (D) Photopolymerization initiator | DAROCURE TPO | 8 | 3 | 15 | 8 | 8 | 8 | 8 | 1 |
| | (E) Surface adjusting agent | TEGO-Rad2100 | 0.1 | 0.1 | 0.1 | 0.1 | 0.1 | 0.1 | 0.1 | 0.1 |
| | (F) Preservation stabilizer | H-TEMPO | 0.3 | 0.3 | 0.3 | 0.3 | 0.3 | 0.3 | 0.3 | 0.3 |
| | (G) Water-soluble ethylenically unsaturated monomer | ACMO | — | — | — | — | — | — | 16.6 | — |

| | | | Example | Comparative Example | | | | | |
|---|---|---|---|---|---|---|---|---|---|
| Resin composition for modeling material | | | M17 | m1 | m2 | m3 | m4 | m5 | m6 |
| Proportioning (part by weight) | (A) Water-insoluble monofunctional ethylenically unsaturated monomer | IBOA | 46.6 | 59.6* | 9.6* | 19.6 | 46.6 | 46.6 | 21.6 |
| | | THFA | — | — | — | — | — | — | — |
| | | PEA | — | — | — | — | — | — | — |
| | (B) Di- or more-functional polyfunctional ethylenically unsaturated monomer | HDDA | 20 | 20 | 47 | 60* | 10* | 40 | 20 |
| | | TPGDA | — | — | — | — | — | — | — |
| | | PE-3A | — | — | — | — | — | — | — |
| | (C) Oligomer | CN991 | 13 | 12 | 35 | 12 | 35 | 5* | 50* |
| | | EBECRYL3708 | — | — | — | — | — | — | — |
| | | CN2203 | — | — | — | — | — | — | — |
| | (D) Photopolymerization initiator | DAROCURE TPO | 20 | 8 | 8 | 8 | 8 | 8 | 8 |
| | (E) Surface adjusting agent | TEGO-Rad2100 | 0.1 | 0.1 | 0.1 | 0.1 | 0.1 | 0.1 | 0.1 |
| | (F) Preservation stabilizer | H-TEMPO | 0.3 | 0.3 | 0.3 | 0.3 | 0.3 | 0.3 | 0.3 |
| | (G) Water-soluble ethylenically unsaturated monomer | ACMO | — | — | — | — | — | — | — |

*means out of the range as defined in claim 1.

was irradiated with an ultraviolet LED, the resin composition was not sufficiently cured. Accordingly, with regard to the resin composition for a modeling material of Example M17, all of the following evaluations were not performed. In addition, the resin compositions for a modeling material of Examples M16 and M17 were cured even at the content of the (D) ingredient of 1 part by weight and 20 parts by weight, respectively, when a mercury lamp or a metal halide lamp was used as an irradiation means.

In addition, with regard to the resin composition for a modeling material of Comparative Example m1, since the content of the (A) ingredient is more than 49 parts by weight, the resin composition was not sufficiently cured even when light was irradiated, regardless of a kind of an irradiation means. Accordingly, with regard to the resin composition for IBOA: isobornyl acrylate [SR506D (number of ethylenic double bonds/one molecule: 1), manufactured by Arkema company]

THFA: tetrahydrofurfuryl acrylate [VISCOAT #150 (number of ethylenic double bonds/one molecule: 1), manufactured by OSAKA ORGANIC CHEMICAL INDUSTRY LYD.]

PEA: phenoxyethyl acrylate [SR3339 (number of ethylenic double bonds/one molecule: 1), manufactured by Arkema company]

HDDA: 1,6-hexanediol diacrylate [SR238 (number of ethylenic double bonds/one molecule: 2), manufactured by Arkema company]

TPGDA: tripropylene glycol diacrylate [SR306 (number of ethylenic double bonds/one molecule: 2), manufactured by Arkema company]

PE-3A: pentaerythritol triacrylate [Light acrylate PE-3A (number of ethylenic double bonds/one molecule: 3), manufactured by KYOEISHA CHEMICAL CO., LTD.]

CN991: urethane acrylate oligomer [CN991 (number of ethylenic double bonds/one molecule: 2), manufactured by Arkema company]

EBECRYL3708: epoxy acrylate oligomer [EBECRYL3708 (number of ethylenic double bonds/one molecule: 2), manufactured by DAICEL-ALLNEX LTD.]

CN2203: polyester acrylate oligomer [CN2203 (number of ethylenic double bonds/one molecule: 2), manufactured by Arkema company]

DAROCURE TPO: 2,4,6-trimethylbenzoyl-diphenylphosphine oxide [DAROCURE TPO, manufactured by BASF SE]

TAGO-Rad2100: silicone acrylate having polydimethylsiloxane structure [TEGO-Rad2100, manufactured by Evonik Degussa Japan Co., Ltd.]

H-TEMPO: 4-hydroxy-2,2,6,6-tetramethylpiperidine-N-oxyl [hydroxyl-TEMPO, manufactured by Evonik Degussa Japan Co., Ltd.]

ACMO: acryloylmorpholine [ACMO (number of ethylenic double bonds/one molecule: 1), manufactured by KJ Chemicals Corporation]

(Measurement of Viscosity)

The viscosity of each resin composition for a modeling material was measured using a R100-type viscometer (manufactured by TOKI SANGYO CO., LTD.) under the conditions of 25° C. and a cone rotation number of 5 rpm, and evaluated under the following criteria. The evaluation results are shown in Table 2.

○: viscosity≤70 mPa·s x: viscosity>70 mPa·s (Evaluation of Curability)

First, each resin composition for a modeling material was printed on a film consisting of polyethylene terephthalate (A4300, manufactured by TOYOBO CO., LTD. 100 mm×150 mm×thickness 188 μm) with a bar coater (#4), respectively, to form a printed film having a thickness of 3 μm. This printed film was irradiated with ultraviolet rays so that the total irradiation light amount became 500 mJ/cm² to cure the film, using an ultraviolet LED (NCCU001E, manufactured by NICHIA CORPORATION) as an irradiation means. The thus cured printed film was touched with a finger, and the presence or absence of attachment of an ink to the finger was investigated visually, and thereby, curability was evaluated under the following criteria. In addition, this evaluation was performed by rubbing an image with a finger from an image part toward a non-printed part. The evaluation results are shown in Table 2.

○: A surface was light to the touch, and there was no feeling of attachment to a finger.

Δ: A surface was slightly wet, and a feeling of attachment to a finger had a sticky feeling.

x: A surface was sticky, and a part of an uncured ink was attached to a finger.

(Preparation of Test Piece)

A glass plate (trade name "GLASS PLATE", manufactured by AS ONE Corporation, 200 mm×200 mm×thickness 5 mm) used for evaluation is a tetragon in a plane view. A spacer having a thickness of 1 mm was disposed on four sides of an upper surface of the glass plate to form a 10 cm×10 cm square region. After each resin composition for a modeling material was cast in the region, another glass plate as described above was placed thereon in the stacked state. Using an ultraviolet LED (NCCU001E, manufactured by NICHIA CORPORATION) as an irradiation means, ultraviolet rays were irradiated so that a total irradiation light amount became 500 mJ/cm², to cure the resin composition. Thereafter, a cured product was released from the glass plate, and excised into a shape of a width 5 mm and a thickness 50 mm with a cutter to obtain a test piece. With regard to the test piece, performance evaluation was performed by the following method. In addition, the evaluation result shows the average result of the results which were obtained by evaluation concerning five test pieces.

(Evaluation of Cure Shrinkage)

First, a test piece which was obtained from each resin composition for a modeling material was immersed in an adjusted 28% aqueous potassium iodide solution. Thereupon, the test piece was floating in the aqueous solution. Then, pure water was added to the aqueous solution until the test piece was brought into the state where it was floating in an intermediate layer part in a water bath. The specific gravity of an aqueous potassium iodide solution thereupon was calculated, and defined as the specific gravity of the test piece. Additionally, the specific gravity of each resin composition for a modeling material was measured with density and specific gravity meters DA-130 (manufactured by KYOTO ELECTRONICS MANUFACTURING CO., LTD.). Cure shrinkage was obtained by the following (i) equation, and was evaluated under the following criteria. The evaluation results are shown in Table 2.

○: cure shrinkage≤10%

Δ: 10%<cure shrinkage<13% x: cure shrinkage≥13%

[Mathematic 1]

$$\text{Cure shrinkage (\%)} = \frac{\text{Specific gravity of test piece} - \text{specific gravity of resin composition for modeling material}}{\text{Specific gravity of test piece}} \quad (i)$$

(Measurement of Glass Transition Point Tg)

A glass transition point Tg of a test piece which had been obtained from each resin composition for a modeling material was measured using a thermogravimeter (TG-DTA2000S Thermo Plus Evoll DSC8230, manufactured by Rigaku Corporation). Measurement was performed at a temperature rise: 10° C./min. in a measurement temperature range: −60° C. to 200° C. The measurement results are shown in Table 2.

(Evaluation of Breaking Strength)

Using Autograph (manufactured by Shimadzu Corporation), a test piece which had been obtained from each resin composition for a modeling material was stretched at a test speed of 50 mm/min., and the tensile breaking strength was measured in accordance with JIS K7113, and defined as the breaking strength. The breaking strength was evaluated under the following criteria. The evaluation results are shown in Table 2.

○: breaking strength≥30 MPa x: breaking strength<30 MPa

TABLE 2

| Resin composition for modeling material | Example | | | | | | | |
|---|---|---|---|---|---|---|---|---|
| | M1 | M2 | M3 | M4 | M5 | M6 | M7 | M8 |
| Viscosity (mPa · s) | ○ | ○ | ○ | ○ | ○ | ○ | ○ | ○ |
| Curability | ○ | ○ | ○ | ○ | ○ | ○ | ○ | ○ |
| Cure shrinkage (%) | ○ | ○ | ○ | ○ | ○ | ○ | Δ | ○ |
| Tg (° C.) | 63.5 | 61 | 76.5 | 21.1 | 25.3 | 55.2 | 53.1 | 45.2 |
| Breaking strength (MPa) | ○ | ○ | ○ | ○ | ○ | ○ | ○ | ○ |

| Resin composition for modeling material | Example | | | | | | | |
|---|---|---|---|---|---|---|---|---|
| | M9 | M10 | M11 | M12 | M13 | M14 | M15 | M16 |
| Viscosity (mPa · s) | ○ | ○ | ○ | ○ | ○ | ○ | ○ | ○ |
| Curability | ○ | Δ | ○ | ○ | ○ | ○ | ○ | X |
| Cure shrinkage (%) | Δ | ○ | ○ | ○ | ○ | ○ | ○ | — |
| Tg (° C.) | 76.5 | 62.8 | 63.4 | 55.3 | 74.8 | 61.4 | 64.7 | — |
| Breaking strength (MPa) | ○ | ○ | ○ | ○ | ○ | ○ | ○ | — |

| Resin composition for modeling material | Example | Comparative Example | | | | | |
|---|---|---|---|---|---|---|---|
| | M17 | m1 | m2 | m3 | m4 | m5 | m6 |
| Viscosity (mPa · s) | — | ○ | ○ | ○ | ○ | ○ | X |
| Curability | — | X | ○ | ○ | X | ○ | ○ |
| Cure shrinkage (%) | — | — | X | X | ○ | Δ | ○ |
| Tg (° C.) | — | — | 47.9 | 60.3 | 61.1 | 67.9 | 45.2 |
| Breaking strength (MPa) | — | — | ○ | ○ | ○ | X | ○ |

As seen from the results of Table 2, the resin compositions for a modeling material of Examples M1 to M16 which satisfy all of the requirements of the present invention showed the viscosity suitable for discharge from an ink-jet head. Additionally, the modeling materials which are obtained by photocuring the resin compositions for a modeling material of Examples M1 to M15 showed excellent curability, and cure shrinkage was suppressed. Thereby, the dimensional accuracy of the formed modeling materials was good. Furthermore, the modeling materials had the high breaking strength.

Additionally, in modeling materials which are obtained from the resin compositions for a modeling material of Examples M1 to M6, M8, and M10 to M15, in which the content of the (B) ingredient is 45 parts by weight or less, and the content of the (C) ingredient is 15 parts by weight or more, cure shrinkage was more suppressed. Furthermore, modeling materials which are obtained from the resin compositions for a modeling material of Examples M1 to M9, and M11 to M15, in which the content of the (D) ingredient is 5 parts by weight or more, showed more excellent curability.

Meanwhile, in the resin composition for a modeling material of Comparative Example m1, since the content of the (A) ingredient is more than 49 parts by weight, insufficient curing of the modeling material was generated. In the resin composition for a modeling material of Comparative Example m2, since the content of the (A) ingredient is less than 19 parts by weight, cure shrinkage of the modeling material was generated. In the resin composition for a modeling material of Comparative Example m3, since the content of the (B) ingredient is more than 50 parts by weight, cure shrinkage of the modeling material was generated. In the resin composition for a modeling material of Comparative Example m4, since the content of the (B) ingredient is less than 15 parts by weight, insufficient curing of the modeling material was generated. In the resin composition for a modeling material of Comparative Example m5, since the content of the (C) ingredient is less than 10 parts by weight, the modeling material caused slight cure shrinkage, and the breaking strength of the modeling material was inferior. In the resin composition for a modeling material of Comparative Example m6, since the content of the (C) ingredient is more than 45 parts by weight, the viscosity was high.

<Resin Composition for Supporting Material>

(Production of Resin Composition for Supporting Material)

(D) to (F), and (G) to (I) ingredients were uniformly mixed at proportioning shown in Table 3 using a mixing and stirring device to produce resin compositions for a supporting material of Examples S1 to S17 and Comparative Examples s1 to s6. Using these resin compositions for a supporting material, the following evaluations were performed.

In addition, in the present examples, as described later, the resin compositions for a supporting material were cured using an ultraviolet LED as an irradiation means. With regard to the resin composition for a supporting material of Example S17, since the content of the (D) ingredient is more than 20 parts by weight, the (D) ingredient was not sufficiently dissolved, and the undissolved residue was generated. Thereby, even when the resin composition for a supporting material of Example S17 was irradiated with an ultraviolet LED, the composition was not satisfactorily cured. Accordingly, with regard to the resin composition for a supporting material of Example S17, all of the following evaluations were not performed. In addition, the resin composition for a supporting material of Example S17 was cured even at the content of the (D) ingredient of 25 parts by weight, when a mercury lamp or a metal halide lamp was used as an irradiation means.

TABLE 3

| Resin composition for supporting material | | | S1 | S2 | S3 | S4 | S5 | S6 | S7 | S8 |
|---|---|---|---|---|---|---|---|---|---|---|
| Proportioning (part by weight) | (G) Water-soluble ethylenically unsaturated monomer | HEAA | 25 | 25 | 25 | 25 | 25 | — | — | — |
| | | ACMO | — | — | — | — | — | 25 | — | 20 |
| | | DMAA | — | — | — | — | — | — | 25 | — |
| | (H) Polyalkylene glycol containing oxyethylene group and/or oxypropylene group | PPG-400 | 45 | — | — | — | — | — | — | — |
| | | PPG-1000 | — | 45 | — | — | 45 | 45 | 45 | 45 |
| | | PEG-400 | — | — | 45 | — | — | — | — | — |
| | | PEG-1000 | — | — | — | 45 | — | — | — | — |
| | (I) Organic solvent | MTG | 21.6 | 21.6 | 21.6 | 21.6 | — | 21.6 | 21.6 | 26.6 |
| | | DPMA | — | — | — | — | 21.6 | — | — | — |
| | (D) Photopolymerization initiator | DAROCURE TPO | 8 | 8 | 8 | 8 | 8 | 8 | 8 | 8 |
| | (E) Surface adjusting agent | TEGO-Rad2100 | 0.1 | 0.1 | 0.1 | 0.1 | 0.1 | 0.1 | 0.1 | 0.1 |
| | (F) Preservation stabilizer | H-TEMPO | 0.3 | 0.3 | 0.3 | 0.3 | 0.3 | 0.3 | 0.3 | 0.3 |

| Resin composition for supporting material | | | S9 | S10 | S11 | S12 | S13 | S14 | S15 | S16 |
|---|---|---|---|---|---|---|---|---|---|---|
| Proportioning (part by weight) | (G) Water-soluble ethylenically unsaturated monomer | HEAA | — | — | — | — | — | — | — | — |
| | | ACMO | 50 | 41.6 | 30 | 40 | 21 | 25 | 25 | 25 |
| | | DMAA | — | — | — | — | — | — | — | — |
| | (H) Polyalkylene glycol containing oxyethylene group and/or oxypropylene group | PPG-400 | — | — | — | — | — | — | — | — |
| | | PPG-1000 | 30 | 45 | 26.6 | 20 | 49 | 45 | 33 | 45 |
| | | PEG-400 | — | — | — | — | — | — | — | — |
| | | PEG-1000 | — | — | — | — | — | — | — | — |
| | (I) Organic solvent | MTG | 11.6 | 5 | 35 | 31.6 | 21.6 | 24.6 | 21.6 | 26.6 |
| | | DPMA | — | — | — | — | — | — | — | — |
| | (D) Photopolymerization initiator | DAROCURE TPO | 8 | 8 | 8 | 8 | 8 | 5 | 20 | 3 |
| | (E) Surface adjusting agent | TEGO-Rad2100 | 0.1 | 0.1 | 0.1 | 0.1 | 0.1 | 0.1 | 0.1 | 0.1 |
| | (F) Preservation stabilizer | H-TEMPO | 0.3 | 0.3 | 0.3 | 0.3 | 0.3 | 0.3 | 0.3 | 0.3 |

| Resin composition for supporting material | | | Example S17 | Comparative Example s1 | s2 | s3 | s4 | s5 | s6 |
|---|---|---|---|---|---|---|---|---|---|
| Proportioning (part by weight) | (G) Water-soluble ethylenically unsaturated monomer | HEAA | — | — | — | — | — | — | — |
| | | ACMO | 25 | 15* | 55* | 40 | 25 | 40 | 20 |
| | | DMAA | — | — | — | — | — | — | — |
| | (H) Polyalkylene glycol containing oxyethylene group and/or oxypropylene group | PPG-400 | — | — | — | — | — | — | — |
| | | PPG-1000 | 35 | 45 | 25 | 51.6* | 26.6 | 15* | 55* |
| | | PEG-400 | — | — | — | — | — | — | — |
| | | PEG-1000 | — | — | — | — | — | — | — |
| | (I) Organic solvent | MTG | 14.6 | 31.6 | 11.6 | — | 40* | 36.6* | 16.6 |
| | | DPMA | — | — | — | — | — | — | — |
| | (D) Photopolymerization initiator | DAROCURE TPO | 25 | 8 | 8 | 8 | 8 | 8 | 8 |
| | (E) Surface adjusting agent | TEGO-Rad2100 | 0.1 | 0.1 | 0.1 | 0.1 | 0.1 | 0.1 | 0.1 |
| | (F) Preservation stabilizer | H-TEMPO | 0.3 | 0.3 | 0.3 | 0.3 | 0.3 | 0.3 | 0.3 |

*means out of the range as defined in claim 8.

HEAA: N-hydroxyethylacrylamide [HEAA (number of ethylenic double bonds/one molecule: one), manufactured by KJ Chemicals Corporation]

ACMO: acryloylmorpholine [ACMO (number of ethylenic double bonds/one molecule: one), manufactured by KJ Chemicals Corporation]

DMAA: N,N'-dimethylacrylamide [DMAA (number of ethylenic double bonds/one molecule: one), manufactured by KJ Chemicals Corporation]

PPG-400: polypropylene glycol [UNIOL D400 (molecular weight 400) manufactured by NOF CORPORATION]

PPG-1000: polypropylene glycol [UNIOL D1000 (molecular weight 1000), manufactured by NOF CORPORATION]

PEG-400: polyethylene glycol [PEG#400 (molecular weight 400), manufactured by NOF CORPORATION]

PEG-1000: polyethylene glycol [PEG#1000 (molecular weight 1000), manufactured by NOF CORPORATION]

MTG: triethylene glycol monomethyl ether [MTG, manufactured by NIPPON NYUKAZAI CO., LTD.]

DPMA: dipropylene glycol monomethyl ether acetate [DAWANOL DPMA, manufactured by The Dow Chemical Company]

(Measurement of Viscosity)

The viscosity of each resin composition for a supporting material was measured using a R100-type viscometer (manufactured by TOKI SANGYO CO., LTD.) under the conditions of 25° C. and a cone rotation number of 5 rpm, and evaluated under the following criteria. The evaluation results are shown in Table 4.

○: viscosity≤70 mPa·s
x: viscosity>70 mPa·s (Solubility in Water)

Into an aluminum cup having a diameter of 50 mm, 2.0 g of each resin composition for a supporting material was collected. Then, using an ultraviolet LED (NCCU001E, manufactured by NICHIA CORPORATION) as an irradiation means, ultraviolet rays were irradiated so that a total irradiation light amount became 500 mJ/cm$^2$ to cure the resin composition, to obtain a supporting material. Thereafter, the supporting material was released from the aluminum cup. Subsequently, the supporting material was immersed in 500 ml of ion-exchanged water contained in a beaker. The supporting material was observed visually every 10 minutes, the time required from immersion initiation to complete dissolution or loss of the original shape (hereinafter, referred to as water dissolution time) was measured, and solubility was evaluated under the following criteria. The evaluation results are shown in Table 4.

◯: water dissolution time≤1 hour
Δ: 1 hour<water dissolution time<1.5 hours
x: water dissolution time>1.5 hours (Evaluation of Oily Effusion)

Into a 100 mm×100 mm aluminum foil, 1.0 g of each resin composition for a supporting material was collected. Then, using an ultraviolet LED (NCCU001E, manufactured by NICHIA CORPORATION) as an irradiation means, ultraviolet rays were irradiated so that a total irradiation light amount became 500 mJ/cm$^2$ to cure the resin composition, to obtain a supporting material. In addition, the supporting material is in the solid state at this time point. This supporting material was allowed to stand for 2 hours, and the presence or absence of oily effusion on a supporting material surface was observed visually, and evaluated under the following criteria. The evaluation results are shown in Table 4.

◯: No oily effusion was observed.
Δ: Slight oily effusion was observed.
x: Much oily effusion was observed.

(Evaluation of Self-Standing Property)

A glass plate (trade name "GLASS PLATE", manufactured by AS ONE Corporation, 200 mm×200 mm×thickness 5 mm) is a tetragon in a plane view. A spacer having a thickness of 1 mm was disposed on four sides on an upper surface of the glass plate to form a 10 cm×10 cm square region. After each resin composition for a supporting material was cast in the region, another glass plate as described above was placed thereon in the stacked state. Using an ultraviolet LED (NCCU001E, manufactured by NICHIA CORPORATION) as an irradiation means, ultraviolet rays were irradiated so that a total irradiation light amount became 500 mJ/cm$^2$ to cure the resin composition, to obtain a supporting material. Thereafter, the supporting material was released from the glass plate, and excised into a shape of a length 10 mm and a width 10 mm with a cutter to obtain a test piece. Then, ten of the test pieces were overlapped to obtain a test piece group having a height of 10 mm. On the test piece group, a 100 g weight was put, this was placed into an oven set at 30° C. as it was, and allowed to stand for 1 hour. Thereafter, a shape of the test pieces was observed, and self-standing property was evaluated under the following criteria. The evaluation results are shown in Table 4.

◯: There was no change in a shape.
Δ: A shape was slightly changed, and the pieces were brought into the state where a weight was tilted.
x: A shape was greatly changed.

As seen from the results of Table 4, the resin compositions for a supporting material of Examples S1 to S16 which satisfy all of the requirements of the present invention had the viscosity suitable for discharge from an ink-jet head. Additionally, supporting materials which are obtained by photocuring the resin compositions for a supporting material of Examples S1 to S16 had high solubility in water, and oily effusion was suppressed. Furthermore, supporting materials which are obtained by photocuring the resin compositions for a supporting material of Examples S1 to S15 had sufficient self-standing property. In addition, in the resin composition for a supporting material of Example S16, since the content of the (D) ingredient is less than 5 parts by weight, even when an ultraviolet LED was irradiated, a radical reaction was not promoted, and self-standing property of the resulting supporting material was not sufficient. In the resin composition for a supporting material of Example S16, when a mercury lamp or a metal halide lamp was used as an irradiation means, the resulting supporting material has sufficient self-standing property even at the content of the (D) ingredient of 3 parts by weight.

Furthermore, supporting materials which are obtained from the resin compositions for a supporting material of Examples S1 to S8, S10, S11, and S13 to S16, in which the content of the (G) ingredient is 45 parts by weight or less, and the content of the (H) ingredient is 25 parts by weight or more, had higher solubility in water. In supporting materials which are obtained from the resin compositions for a supporting material of Examples S1 to S10, S12, and 514 to S16, in which the content of the (H) ingredient is 45 parts by weight or less, and the content of the (I) ingredient is 30 parts by weight or less, oily effusion was more suppressed. Supporting materials which are obtained from the resin compositions for a supporting material of Examples S1 to S7, S9 to S12, S14, and S15, in which the content of the (G) ingredient is 25 parts by weight or more, had more sufficient self-standing property.

Meanwhile, in the resin composition for a supporting material of Comparative Example s1, since the content of the (G) ingredient is less than 20 parts by weight, self-standing property of the supporting material was not sufficient. In the resin composition for a supporting material of Comparative Example s2, since the content of the (G) ingredient is more than 50 parts by weight, solubility of the supporting material in water was low. In the resin composition for a supporting material of Comparative Example s3, since the content of the (H) ingredient is more than 49 parts by weight, the viscosity was high, and oily effusion was

TABLE 4

| Resin composition for supporting material | Example | | | | | | | | | | | |
|---|---|---|---|---|---|---|---|---|---|---|---|---|
| | S1 | S2 | S3 | S4 | S5 | S6 | S7 | S8 | S9 | S10 | S11 | S12 |
| Viscosity (mPa · s) | ◯ | ◯ | ◯ | ◯ | ◯ | ◯ | ◯ | ◯ | ◯ | ◯ | ◯ | ◯ |
| Solubility in water | ◯ | ◯ | ◯ | ◯ | ◯ | ◯ | ◯ | ◯ | Δ | ◯ | ◯ | Δ |
| Oily effusion | ◯ | ◯ | ◯ | ◯ | ◯ | ◯ | ◯ | ◯ | ◯ | ◯ | Δ | ◯ |
| Self-standing property | ◯ | ◯ | ◯ | ◯ | ◯ | ◯ | ◯ | Δ | ◯ | ◯ | ◯ | ◯ |

| Resin composition for supporting material | Example | | | | | Comparative Example | | | | | |
|---|---|---|---|---|---|---|---|---|---|---|---|
| | S13 | S14 | S15 | S16 | S17 | s1 | s2 | s3 | s4 | s5 | s6 |
| Viscosity (mPa · s) | ◯ | ◯ | ◯ | ◯ | — | ◯ | ◯ | X | ◯ | ◯ | X |
| Solubility in water | ◯ | ◯ | ◯ | ◯ | — | ◯ | X | ◯ | ◯ | X | ◯ |
| Oily effusion | Δ | ◯ | ◯ | ◯ | — | ◯ | ◯ | Δ | X | X | X |
| Self-standing property | Δ | ◯ | ◯ | X | — | X | ◯ | ◯ | ◯ | ◯ | ◯ | generated in the supporting material. In the resin composition for a supporting material of Comparative Example s4, since the content of the (I) ingredient is more than 35 parts by weight, oily effusion was generated in the supporting material. In the resin composition for a supporting material of Comparative Example s5, since the content of the (H) ingredient is less than 20 parts by weight, solubility of the supporting material in water was low. Additionally, in the resin composition for a supporting material of Comparative Example s5, since the content of the (I) ingredient is more than 35 parts by weight, oily effusion was generated in the supporting material. In the resin composition for a supporting material of Comparative Example s6, since the content of the (H) ingredient is more than 49 parts by weight, the viscosity was high, and oily effusion was generated in the supporting material.

<Photofabrication Product>
(Evaluation of Adherence)

A glass plate (trade name "GLASS PLATE", manufactured by AS ONE Corporation, 200 mm×200 mm×thickness 5 mm) used in evaluation is a tetragon in a plane view. A spacer having a thickness of 1 mm was disposed on four sides on an upper surface of the glass plate to form a 10 cm×10 cm square region. After each resin composition for a supporting material was cast in the region, ultraviolet rays were irradiated using an ultraviolet LED (NCCU001E, manufactured by NICHIA CORPORATION) as an irradiation means so that a total irradiation light amount became 500 mJ/cm$^2$ to cure the resin composition, to obtain a supporting material.

Then, by disposing a spacer having a thickness of 1 mm on four sides of an upper surface of the supporting material, a 10 cm×10 cm region was formed. After each resin composition for a modeling material was cast in the region, ultraviolet rays were irradiated using an ultraviolet LED (NCCU001E, manufactured by NICHIA CORPORATION) as an irradiation means so that a total irradiation light amount became 500 mJ/cm$^2$ to cure the resin composition, to obtain a modeling material.

After the modeling material was allowed to stand in this state in a constant temperature bath at 30° C. for 12 hours, an appearance of adherence between the modeling material and the supporting material was confirmed visually, and thereby, evaluation was performed under the following criteria. The results are shown in Table 5.
○: A modeling material and a supporting material were closely adhered.
Δ: A modeling material and a supporting material were closely adhered, but when an interface between the modeling material and the supporting material was scraped with a nail, peeling was generated.
x: Peeling was generated at an interface of a modeling material and a supporting material, and the modeling material was peeled so as to be warped, due to cure shrinkage of the modeling material.

TABLE 5

| | Photofabrication product | | | | | | | | | |
|---|---|---|---|---|---|---|---|---|---|---|
| | 1 | 2 | 3 | 4 | 5 | 6 | 7 | 8 | 9 | 10 |
| Resin composition for modeling material | M1 | M1 | M2 | M2 | M1 | M2 | m2 | m3 | m2 | m3 |
| Resin composition for supporting material | S2 | S6 | S2 | S6 | s4 | s6 | S2 | S6 | s4 | s6 |
| Adherence | ○ | ○ | ○ | ○ | Δ | Δ | Δ | Δ | X | X |

As seen from the results of Table 5, in photofabrication products 1 to 8 in which at least one of the resin composition for a modeling material and the resin composition for a supporting material satisfies the requirements of the present invention, the modeling material and the supporting material were closely adhered. Furthermore, in photofabrication products 1 to 4 in which both of the resin composition for a modeling material and the resin composition for a supporting material satisfy the requirements of the present invention, peeling is not generated at an interface between the modeling material and the supporting material, and the modeling material and the supporting material were more closely adhered. In this way, when the modeling material and the supporting materials are closely adhered, photofabrication products having good dimensional accuracy are obtained.

On the other hand, in photofabrication products 9 and 10 in which both of the resin composition for a modeling material and the resin composition for a supporting material do not satisfy the requirements of the present invention, peeling was generated at an interface between the modeling material and the supporting material. In this way, when adherence between the modeling material and the supporting material is worse, dimensional accuracy of photofabrication products deteriorates.

INDUSTRIAL APPLICABILITY

The resin composition for a modeling material and the resin composition for a supporting material of the present invention can obtain photofabrication products having good dimensional accuracy, by photocuring. Accordingly, these resin compositions can be suitably used for producing photofabrication products by an ink-jet photofabrication method.

The invention claimed is:
1. A resin composition for a modeling material for use in shaping a modeling material by an ink-jet photofabrication method, the resin composition comprising, based on 100 parts by weight of the whole resin composition:
    19 to 49 parts by weight of a water-insoluble monofunctional ethylenically unsaturated monomer (A), wherein the water-insoluble monofunctional ethylenically unsaturated monomer (A) comprises isobornyl (meth)acrylate;
    15 to 50 parts by weight of a di- or more-functional polyfunctional ethylenically unsaturated monomer (B);
    10 to 45 parts by weight of an oligomer (C), wherein the oligomer (C) is one or more selected from the group consisting of a urethane (meth)acrylate oligomer, an epoxy (meth)acrylate oligomer, and a polyester (meth)acrylate oligomer; and
    5 to 15 parts by weight of a photopolymerization initiator (D).
2. The resin composition for a modeling material according to claim 1, wherein the content of the (A) ingredient is 25 to 47 parts by weight, based on 100 parts by weight of the whole resin composition.
3. The resin composition for a modeling material according to claim 1, wherein the content of the (B) ingredient is 20 to 45 parts by weight, based on 100 parts by weight of the whole resin composition.
4. The resin composition for a modeling material according to claim 1, wherein the content of the (C) ingredient is 15 to 30 parts by weight, based on 100 parts by weight of the whole resin composition.

5. The resin composition for a modeling material according to claim 1, wherein the resin composition further comprises a preservation stabilizer (F) at 0.05 to 3.0 parts by weight, based on 100 parts by weight of the whole resin composition.

6. A resin composition for a supporting material for use in shaping a supporting material by an ink-jet photofabrication method, the resin composition comprising, based on 100 parts by weight of the whole resin composition:
- 20 to 50 parts by weight of a water-soluble monofunctional ethylenically unsaturated monomer (G);
- 20 to 49 parts by weight of polyalkylene glycol (H) comprising an oxyethylene group and/or an oxypropylene group;
- 35 parts by weight or less of a water-soluble organic solvent (I); and
- a photopolymerization initiator (D).

7. The resin composition for a supporting material according to claim 6, wherein the content of the (G) ingredient is 25 to 45 parts by weight, based on 100 parts by weight of the whole resin composition.

8. The resin composition for a supporting material according to claim 6, wherein the content of the (H) ingredient is 25 to 45 parts by weight, based on 100 parts by weight of the whole resin composition.

9. The resin composition for a supporting material according to claim 6, wherein the content of the (D) ingredient is 5 to 20 parts by weight, based on 100 parts by weight of the whole resin composition.

10. The resin composition for a supporting material according to claim 6, wherein the content of the (I) ingredient is 5 parts by weight or more, based on 100 parts by weight of the whole resin composition.

11. The resin composition for a supporting material according to claim 6, wherein the resin composition further comprises a preservation stabilizer (F) at 0.05 to 3.0 parts by weight, based on 100 parts by weight of the whole resin composition.

12. A photofabrication product comprising a modeling material which is obtained by photocuring a resin composition for a modeling material according to claim 1, by an ink-jet photofabrication method.

13. The resin composition for a modeling material according to claim 1, wherein the resin composition has a viscosity of 70 mPa·s or less at 25° C.

14. The resin composition for a modeling material according to claim 1, wherein the content of the (C) ingredient is 10 to 30 parts by weight, based on 100 parts by weight of the whole resin composition.

* * * * *